Figure 1:
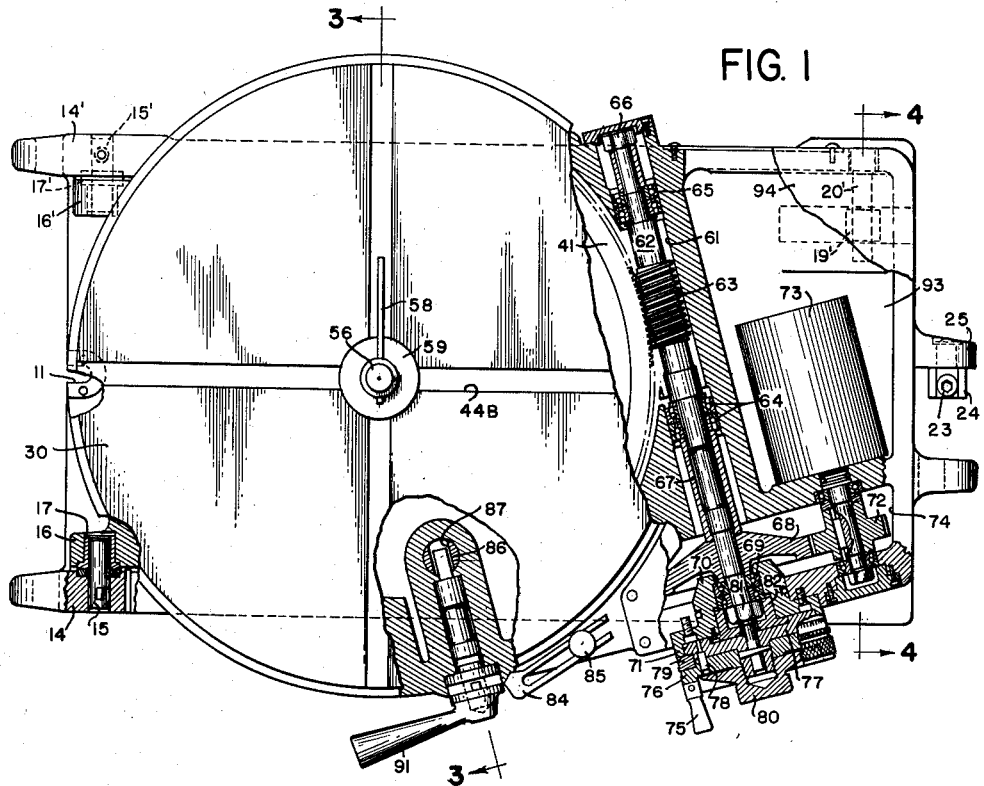

April 23, 1963 M. P. BUDNEY ET AL 3,086,409
SINE BAR ROTARY TABLE
Filed Aug. 20, 1956 2 Sheets-Sheet 1

INVENTORS
M. P. BUDNEY
H. S. BUDNEY
T. W. BUDNEY
M. F. SACZAWA

BY *Ayatt & Dowell*
ATTORNEYS

April 23, 1963    M. P. BUDNEY ET AL    3,086,409
SINE BAR ROTARY TABLE
Filed Aug. 20, 1956    2 Sheets-Sheet 2

INVENTORS
M.P. BUDNEY
H.S. BUDNEY
T.W. BUDNEY
M.F. SACZAWA

BY *A. Yates Dowell*
ATTORNEYS

United States Patent Office 3,086,409
Patented Apr. 23, 1963

3,086,409
SINE BAR ROTARY TABLE
Michael P. Budney, Berlin, Henry S. Budney and Thaddeus W. Budney, Newington, and Matthew F. Saczawa, Wethersfield, Conn., assignors to Atlantic Machine Tool Works, Inc., Newington, Conn.
Filed Aug. 20, 1956, Ser. No. 605,017
6 Claims. (Cl. 77—63)

The present invention relates to equipment for accurately machining parts and more particularly to a work support for use with a boring machine to provide for accurately locating work with respect to a drill in various angular relations and for locating work with respect to a drill in various rectilinear positions whereby a bore may be provided in any desired angular relation and in any desired position in the work.

Previously known types of boring equipment have included means for positioning the work so that a bore could be provided in a desired location in the work but the work support and positioning means according to the prior art have not been entirely satisfactory because of the difficulty of obtaining accurate adjustments in the various angular positions and also because the dials indicating the position of the work could not be easily read from the front of the machine without requiring the operator to move to some unnatural position to obtain an accurate reading, also the lubrication in prior structures has not been entirely satisfactory and the lost motion of the parts has resulted in faulty products.

Accordingly, it is an object of the present invention to provide a work support that will overcome these deficiencies of the prior art.

Another object of the invention is to provide a boring machine with a work support providing adjustability within extremely accurate limits and which will maintain its accuracy without appreciable maintenance.

A further object is to provide a sine bar in which conventional gage blocks may be used to obtain a selected angle without requiring specially made blocks.

Another object is to provide a rotary table with power means and hand means to rotate the table and with dials and cooperating vernier scales arranged at an angle so as to be readily readable from the normal position of the operator in front of the machine.

A further object is to provide lubrication for a rotary table which will be effective even though the rotary table is tilted at a substantial angle.

A still further object is to provide for accurate assembly of the operating parts of a machine to avoid extensive adjustment after installation and after use.

A further object is to provide a rotary adjusting structure in which an angular accuracy of two or three seconds may be obtained.

Figure 2:
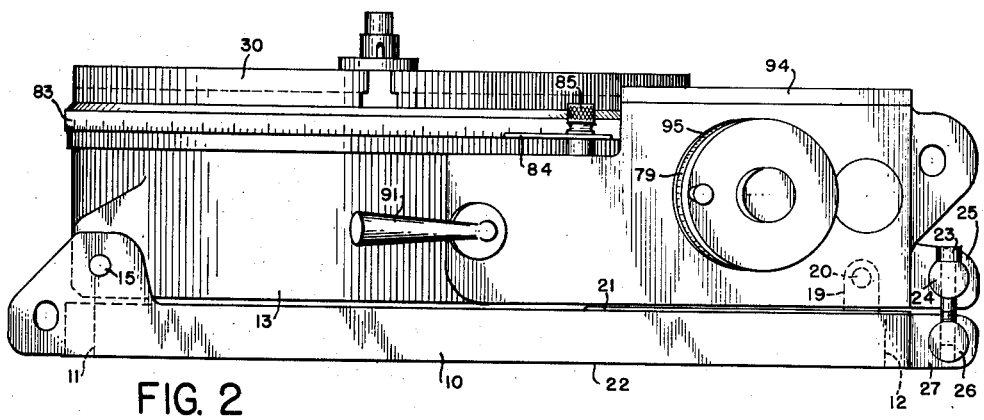
Figure 3:
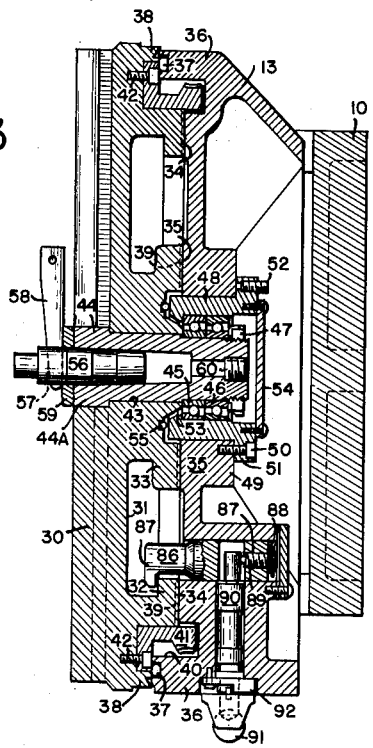
Figure 4:
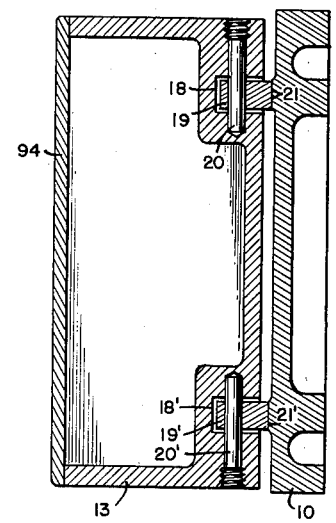
Figure 5:
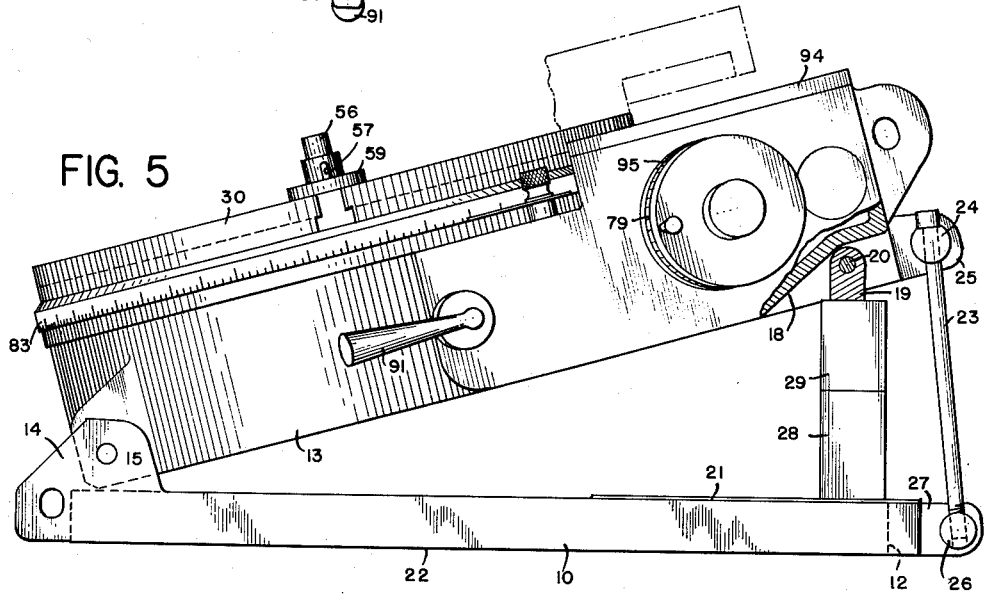

Other and further objects will be apparent as the description proceeds and upon reference to the accompanying drawings wherein:

FIG. 1 is a plan view of a sine bar rotary table made in accordance with the present invention with parts broken away and parts in section to show the structure for obtaining the rotary adjustment and for the locking of the rotary table in adjusted position;

FIG. 2, a front elevation of the sine bar rotary table showing the rotary table parallel to the sine bar plate;

FIG. 3, a section taken substantially on line 3—3 of FIG. 1 through the sine bar plate, the base and rotary table showing the rotary table lock and the rotary table center bearing construction;

FIG. 4, a section taken on line 4—4 of FIG. 1 showing the swing blocks on the rotary table base which engage the sine bar plate to obtain a parallel relation of the rotary table to the sine bar plate; and FIG. 5, a front view similar to that shown in FIG. 2 with gage blocks arranged between the swing blocks and the sine bar plate for obtaining a predetermined angle between the rotary table and sine bar plate.

Briefly, the present invention comprises a sine bar plate for attachment to a conventional rectilinearly movable table of a boring machine. A base is pivotally mounted by one end to one end of the sine bar plate and is provided with swing blocks at its other end for engagement with the other end of the sine bar plate. Gage blocks may be positioned between said swing blocks and said other end of said sine bar plate for obtaining predetermined angular relations. A circular table is rotatably mounted on said base and is rotated by a ring type worm gear fixed to the circular table adjacent its periphery which worm gear meshes with a worm on a hand operated shaft rotatably mounted in accurate bearings in the base, the hand operated shaft being disposed at an angle to the base permitting easy reading of the dials thereon.

The base is provided with track means on its upper side while the rotary table is provided with a T-shaped groove on its under side providing two flanged tracks which cooperate with the track means on the base. A center shaft is fixed to the rotary table and cooperates with bearings mounted on an eccentric bearing retainer adjustably mounted in the base providing for adjustment between the worm gear and the worm so that lost motion is entirely eliminated and any rotation of the hand operated shaft will accurately move the rotary table while the dial on the hand operated shaft will accurately indicate the angle. A protractor scale on the table cooperates with an adjustable pointer means on the base to indicate angles by degrees while the dial on the hand operated shaft provides for the accurate reading of angles in minutes and the seconds may be estimated within 2 to 3 seconds by means of a vernier scale fixed on the base. For rapid adjustment a motor is provided to rapidly rotate the hand operated shaft being arranged to permit the final or extremely accurate adjustment to be made by hand.

Referring more particularly to the drawings, a sine plate 10 is adapted to be mounted on the conventional rectilinearly movable supporting table of a boring machine by means of bolts not shown passing through a slot 11 at one end and a pair of slots 12 at the other end. An elongated base 13 is pivotally mounted perpendicular to its longitudinal axis at one end to upstanding lugs 14, 14' on one end of the sine plate 10 by means of pivot pins 15, 15' suitably fixed in said lugs by any suitable means such as set screws or the like. In lugs 16, 16' at said one end of the base 13 accurately machined bushings 17, 17' receive pins 15, 15' whereby the base 13 may pivot from the position shown in FIGURES 1 and 2 to various angular positions such as that shown in FIGURE 5.

Recesses 18, 18' are provided in the other end of the base 13 to receive swing blocks 19, 19' pivoted on pins 20, 20' accurately retained in fixed position in the base 13 by suitable means such as set screws or the like and about which pins the swing blocks are accurately fitted. The swing blocks normally rest upon the machined surface of raised portions 21, 21' of sine plate 10 which portions are accurately machined in parallel relation to the under surface 22 of the sine bar plate 10. The base 13 is maintained in fixed position with relation to the sine bar plate 10 by means of a socket head screw 23 which is freely rotatable in a hold-down plug 24 pivotally mounted on a lug 25 at the said other end of the base while the threads of the socket-head bolt 23 are received in a tapped bore of a second hold-down plug 26 pivoted to a lug 27 on the said other end of base plate 13. It will be noted that other lengths of hold-down bolts 23 may be used to accommodate for different angular relations of the base with respect to the sine bar plate such as the relation shown in FIGURE 5 in which one or more gage blocks 28, 29 are positioned between the machined surface 21 of the sine plate 10 and the swing blocks 19 of the base 13 while a similar set of identical gage blocks would be provided between the machined surface 21' to engage the swing block 19'. The hold-down bolt 23 of suitable length maintains the base in fixed angular relation to the sine bar plate 10 in accordance with the distance between the pin 15 and the pin 20 corresponding to the hypotenuse of a right triangle, the height of the gage blocks 29 and 28 and the height of the swing block from the center of the pin 20 to the lower surface of the swing block corresponding to one accurately known leg of a right triangle. A rotatable circular table 30 having a circular T-shaped groove 31 on its lower surface separating an outer circular flanged track 32 from an inner circular flanged track 33 is supported on inner and outer circular track means 34 and 35 respectively on the upper surface of the base 13. An upstanding peripheral wall 36 is provided around the periphery of the base 13 and has an oil seal 37 in a groove in the upper edge thereof which seal contacts a downwardly extending skirt portion 38 of the rotary table 30 to maintain an oil-tight seal. To provide for constant lubrication grooves 39 are provided in the flanged tracks 32 and 33 providing communication between groove 31 and an annular space 40. A worm gear 41 located in annular space 40 is fixed to the rotary table 30 by suitable machine screws 42, lubricant being provided at a constant level to maintain proper lubrication of the worm gear 41 and of the tracks 32 to 34 inclusively. The lubricant level may be observed through a window in the base.

Within a central bore 43 of the table 30 a stepped shaft 44 is press-fitted with its upper stepped portion 44A having a shoulder which engages a shoulder at the bottom of dove tail grooves 44B on the rotary table 30 to limit the downward insertion of such stepped shaft 44. Duplex anti-friction thrust bearings 45, 46 are press-fitted with their inner races in contact with the reduced lower end of the stepped shaft 44, being retained on said lower portion by a lock nut 47 which maintains said inner races in abutting relation to the under surface of the rotary table 30, the outer races of such bearings 45, 46 being received by the inner cylindrical surface of a bearing retainer 48. The bearing retainer 48 has an outer cylindrical surface slightly eccentric or off-set approximately .0042 to .0038 inch to provide for adjustment of the center of the table and of the worm gear 41. Said bearing retainer 48 is mounted in a centrally disposed hub 49 in the base 13 and is retained therein by means of socket head cap screws 50 passing through an outwardly extending flange 51 of the bearing retainer 48 while the spacing of such flange 51 is controlled by means of half-dog set screws 52 received in tapped bores in the flange 51. The bearing retainer 48 is also provided with an inwardly extending lip 53 at its upper end which engages the upper edge of the outer race of the bearing 45 which outer race in turn engages the outer race of the bearing 46 whereby relative adjustment of the lock nut 47 and the inner races 45 and 46 and the adjustment of the bearing retainer 48 will control the pressure of the flange tracks 32 and 33 respectively of the rotary table on the track means 34 and 35 respectively of the base. The adjustment of preferably three half-dog set screws 52 will provide for this accurate adjustment while preferably three socket-head cap screws 50 will serve to maintain the adjustment.

The bearings 45 and 46 will be permanently lubricated by lubrication in the bearing retainer 48 to which access is obtained by a removably cover plate 54 and the lubricant being prevented from mixing with the lubricant of the tracks by an O ring seal 55 in a groove in the table 30 which O ring rubs against the upper end of the bearing retainer 48.

For accurately locating the center of the table 30, the center shaft 44 is provided with a tapered inner bore which receives a tapered true-up plug 56, having a true center at its upper end and having a slot 57 for receiving a drift key 58 adapted to engage a washer 59 to provide for removal of the true-up plug whereby the center shaft 44 may be of a size not to project above the upper surface of the rotary table 30 permitting clamping articles on such rotary table without interference. A set screw 60 is provided to close the lower end of the bore of the center shaft 44.

The base 13 has a bore 61 formed from the front to the rear thereof at an angle to the axes of pins 15, 15', with the bore substantially parallel to the plane of the rotary table 30 and in such bore a hand-operated shaft 62 is positioned, such shaft carrying a worm 63 integral therewith. The shaft 62 is rotatably mounted by means of two sets of thrust type friction bearings 64 and 65 the outer races of which are press-fitted into enlargements of the bore 61, with the inner races of such anti-friction bearings pressed-fitted onto reduced portions of the hand-operated shaft 62. The inner races of bearings 65 are secured in position by means of a spacer sleeve and spacer washers fixed in position and held in fixed position by a nut 66. The inner races of the bearings 64 are also fixed in position by means of a spacer sleeve 67 and spacer washer, the spacer sleeve 67 abutting against a spur gear 68, which in turn abuts against the inner races of an anti-friction bearing 69 mounted in a cone-shaped bearing retainer 70 fixed to the base 13 by suitable screws and carrying an outwardly projecting flange 71 having a vernier scale thereon. A suitable oil seal is maintained between the bearing retainer 70 and the base 13 by means of a conventioal O-ring.

In mesh with the spur gear 68 is a pinion gear 72 mounted on the shaft of a motor 73, which may be manually controlled for extensive rotation of the shaft 62 to provide for extensive adjustment of the rotary table 30. Suitable bearings are provided for the motor shaft and pinion gear 72 and a suitable oil seal is provided to prevent lubrication from being lost from the chamber 74 housing the gears 68 and 72.

Manual rotation of the shaft 62 is obtained by means of a handle 75, pivotally mounted on a hand wheel 76 which is slidably mounted on the hub portion of a lock wheel 77 fixed to a forward extension of the shaft 62 by a pin, the hand-wheel 76 being keyed to the lock wheel 77 by one or more pins 78. The periphery of the hand-wheel 76 and lock wheel 77 are provided with registering grooves which receive an annular dial 79 with graduations to indicate angular position, the dial 79 being adjustably secured in such groove by a lock nut 80, threadably mounted on the hub portion of the lock wheel 77 whereby a frictional gripping of the dial 79 is obtained to cause the dial to rotate with the hand-wheel 76.

Axial movement of the shaft 62 is prevented by means of a nut 81 threaded on the shaft and urging the inner races of the bearing 69 against the spur gear 68, which reacts against the sleeve 67 and the inner races of bearings 64 to a spacer washer abutting against a shoulder on the shaft 62. The outer races of the bearings 69 are fixed in position by a retainer element 82 suitably fixed to the retainer 70 and having an oil seal to maintain lubrication within the chamber 74.

The rotary table 30 is provided with a protractor scale 83 around its periphery which cooperates with an adjustable pointer device 84 fixed in position by means of a screw 85 passing through a slot in the pointer device and threaded into the base 13 to indicate degrees of rotation of the rotary table 30.

The gear ratio between worm gear 31 and worm 63 is preferably 1 to 360 and therefore shaft 62 rotates one revolution for each degree of movement of the table 30, the dial 79 is therefore divided into 60 minutes and cooperates with a vernier scale on the vernier dial 71. The vernier dial is arranged to facilitate reading the scale on dial 79 from the normal position of an operator located in front of the rotary sine bar table whereby the angle of rotation may be measured accurately within 2 or 3 seconds.

When the table 30 has been rotatably adjusted to the desired location it is locked in adjusted position by a table lock 86, which has a body portion of circular outline with an eccentric receiving aperture therethrough. A lug 87 integral with lock 86 overlies the flange of the flanged track 32, the table lock 87 being normally held in raised position by a spring 88 pressing against a removable cover which closes the bottom of the bore in which the table lock 86 is slidably mounted. A set screw 89 of the half-dog type cooperates with eccentric pin of lock shaft 90, which shaft is rotatively mounted in a bore in the base 13 so that rotation of shaft 90 controls the lock, a second set screw being provided to hold the half dog set screw 89 in position the shaft 90 having a handle 91 fixed thereon to provide for approximately 180 degrees of rotation of the lock shaft 90. Suitable stops are provided in a lock shaft retainer 92 which cooperates with a dowel-pin in the handle to limit the movement of lock shaft 90. It will thus be seen that the table may be locked against rotation by the handle 91 and the lock may be released by the spring 88 upon the unlocking rotation of the handle 91.

The space 74 receiving the gears 68 and 72 and a motor receiving space 93 are covered by means of a cover plate 94 suitably secured to the base to obtain an oil tight seal while providing for access to the parts.

A vernier scale 95 is provided on the flange 71 in approximately the position shown to cooperate with the scale on the dial 76, which is divided into minutes and half-minutes, the vernier scale of sixty seconds being provided with 12 equal spaces with long lines for each 10 seconds so that there are 13 long lines which cooperate in the usual manner with the scale on the dial 79 whereby the seconds can be estimated within 2 or 3 seconds of rotation. The bearings are so adjusted and the accuracy in machining is kept within a few ten thousandths of an inch so that there is no lost motion and the reading of the dial will accurately indicate the angular position of the work.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A work support for use on a boring machine for accurately locating the work comprising a sine plate having accurately machine parallel upper and lower surfaces, means to attach the sine plate to the rectilinearly movable table of a boring machine, an elongated base pivotally mounted at one end to one end of said sine plate for relative movement from a position substantially parallel to said sine plate to a position substantially at an angle thereto, a pair of swing blocks pivotally mounted on the other end of said base and adapted to contact the upper machined surface on said sine plate when said base is in parallel relation to said sine plate, accurate gage spacers being adapted to be interposed between said swing blocks and said sine plate for maintaining said base at a selected predetermined angle, means to secure said base plate in fixed relation to said sine plate to maintain a snug accurate engagement between said swing block and said sine plate, a rotary table, means to rotatably mount said rotary table on said base, said base having a plurality of circular track means, said table having a circular T-shaped groove providing a plurality of cooperating circuit tracks with lubricant passages extending across each track and one of said tracks providing a locking flange, said base having an upstanding peripheral wall projecting above said tracks, said upstanding wall having a groove on the upper surface thereof with sealing means in said groove, a worm gear fixedly mounted on said rotary table having an accurately located central bore therein, a stepped center shaft mounted in said bore of said rotary table, a set of duplex thrust anti-friction bearings mounted on said center shaft below said table, said base having a bore in approximate alignment with the axis of the bore of said rotary table and said center shaft, a bearing retainer in said bore of said base having an inwardly projecting lip at the upper end and an outwardly projecting flange at the lower end, the inner surface of said retainer being cylindrical and the outer surface being cylindrical, but with the inner and outer surfaces being eccentric to one another, said set of duplex thrust antifriction bearings being located in said retainer, a nut for retaining the inner races of said antifriction bearing in accurate position on said center shaft to draw said center shaft downwardly and maintain an accurate relation between said rotary table and said inner races, the lip of said retainer maintaining the outer races against upward movement whereby axial thrust is transmitted through the outwardly extending flange of the retainer to the base, means to maintain the retainer in adjusted angular positions as well as in adjusted axial position for accurately centering said table on said base, a shaft arranged at an acute angle to the axis of the pivotal movement of said base with respect to said sine plate, said shaft having a worm thereon with the worm of said shaft in mesh with the worm gear, duplex bearings on said worm shaft and accurately pressed in position in said base to maintain said worm shaft against axial and radial movement while permitting rotation thereof, a vernier scale fixed on said base, a setting dial rotatably adjustable on said worm shaft, means to secure said setting dial in relation to said worm shaft, hand means to rotate said worm shaft, power means to rotate said worm shaft whereby extensive adjustment may be made by said power means and accurate adjustment may be made by said hand means, a protractor scale on said rotary table, an adjustable pointer on said base and adjustable so that the point thereof may indicate an angle on said protractor on said table, a table lock slidably mounted in said base and having a lug engaging the locking flange on said table, a lock shaft rotatably mounted in said base and having an eccentric cooperating with said table lock for drawing the lug against the locking flange, and means to rotate said lock shaft from a position releasing said table for rotation to a position to maintain said table against rotation.

2. A rotary table for use in a machining operation comprising an elongated support, a base mounted on said support, a table rotatably mounted on said base and adapted to receive work to be machined, means to rotate said table including a shaft arranged at an obtuse angle to the longitudinal direction of the base and having means on the shaft cooperating with the means on the table for rotating said table upon rotation of said shaft, a gear upon said shaft, a motor mounted in said base and having a gear in mesh with said gear upon said shaft whereby said shaft may be rotated by said motor, and hand means for rotating said shaft independently of said motor whereby accurate positioning of the table may be had, said table being provided with a protractor scale around its periphery, a pointer on the base for cooperation with said protractor, a dial on said shaft for indicating fractions of degrees of rotation of said table said structure being such as to keep the overall dimensions to a minimum while improving the readability of said protractor.

3. The invention according to claim 2 in which the parts are so accurately dimensioned and adjusted that accuracy can be obtained of approximately two to three seconds.

4. A rotary table for use in a machining operation comprising a support, a base mounted on said support, said base having a longitudinal axis, a table rotatably mounted on said base and adapted to receive work to be machined, means to rotate said table including a shaft arranged at an obtuse angle to the longitudinal axis of said base, means on the shaft cooperating with the means on the table for rotating said table upon rotation of said shaft, a gear upon said shaft, a motor mounted on said base inwardly of said gear upon said shaft and having a gear in mesh with said gear upon said shaft whereby said shaft may be rotated by said motor, and hand means for rotating said shaft independently of said motor whereby accurate positioning of the table may be had.

5. A sine bar rotary table for obtaining accurate angular cuts in accurate inclination comprising a plate for securement to the bed of a machine and having an accurately machined lower surface for contacting the bed of a machine to which it is attached, a base pivotally mounted on said plate for swinging movement on an axis parallel to said plate and to said base from a position substantially parallel to said plate to a position at an inclination thereto, means to positively pivotally connect one end of said base to one end of said plate, means to accurately adjust the other end of said base with respect to the other end of said plate to obtain a precise angular relation between said base and said plate, a rotatable table mounted on said base for rotation about an axis disposed in accurate relation to said base whereby said axis may be perpendicular to said plate or at a selected angle thereto, worm gear means to accurately rotate said table for precise angular movements thereof so that work supported on said rotary table can be accurately machined, said means to rotate said table including a manual adjustment with graduations to obtain accuracies in the order of two or three sections, said worm gear means including a worm shaft on said base disposed at an angle to said axis parallel to said plate and base to provide for easy access thereto without danger of injury to the operator.

6. The invention according to claim 5 in which power means are provided for rotating said worm shaft whereby the angular position of said table on said base can be accurately read from the graduations.

References Cited in the file of this patent
UNITED STATES PATENTS

| | | |
|---|---|---|
| 1,100,522 | Brown et al. | June 16, 1914 |
| 1,376,168 | Sears | Apr. 26, 1921 |
| 2,114,911 | Burt | Apr. 19, 1938 |
| 2,177,006 | Rusnak | Oct. 24, 1939 |
| 2,351,773 | Lovenston | June 20, 1944 |
| 2,411,641 | Sealey | Nov. 26, 1946 |
| 2,465,497 | Turrettini | Mar. 29, 1949 |
| 2,567,517 | Keebler | Sept. 11, 1951 |
| 2,610,552 | Victory | Sept. 16, 1952 |
| 2,816,489 | Robbins et al. | Dec. 17, 1957 |
| 2,876,661 | Jaeger | Mar. 10, 1959 |